(12) United States Patent
Rowell et al.

(10) Patent No.: US 7,764,169 B2
(45) Date of Patent: Jul. 27, 2010

(54) SYSTEM FOR MONITORING A PLURALITY OF SENSORS

(75) Inventors: Shane Morse Rowell, Arlington, WA (US); Anthony Edward Develice, Mukilteo, WA (US); Timothy Allen Christensen, Camano Island, WA (US)

(73) Assignee: Eaton Corporation, Cleveland, OH (US)

( * ) Notice: Subject to any disclaimer, the term of this patent is extended or adjusted under 35 U.S.C. 154(b) by 314 days.

(21) Appl. No.: 12/046,587

(22) Filed: Mar. 12, 2008

(65) Prior Publication Data

US 2009/0231123 A1 Sep. 17, 2009

(51) Int. Cl.
*G08B 29/00* (2006.01)
(52) U.S. Cl. .................. 340/508; 340/507; 340/517; 340/532; 340/286.02; 702/116
(58) Field of Classification Search ................. 340/508, 340/506, 507, 509, 517, 521, 532, 870.16, 340/286.02; 702/35, 36, 58, 116, 185
See application file for complete search history.

(56) References Cited

U.S. PATENT DOCUMENTS

| 5,581,180 | A | * | 12/1996 | Ito et al. ................. 324/207.11 |
| 5,977,662 | A | | 11/1999 | Lamarche et al. |
| 6,247,664 | B1 | * | 6/2001 | Petersen et al. .......... 242/485.6 |
| 6,356,202 | B1 | | 3/2002 | Albrich et al. |
| 7,432,703 | B2 | * | 10/2008 | Heimlicher et al. .... 324/207.16 |

* cited by examiner

*Primary Examiner*—Toan N Pham
(74) *Attorney, Agent, or Firm*—Martin J. Moran; John A. Kastelic

(57) ABSTRACT

A monitoring system for detecting faults in an apparatus, such as a ski lift, employs a communication network onto which a sensor bus controller periodically transmits a safety message and receives a echo of each safety message. Different sensors are coupled to sensor adapter modules that in turn are connected in a series to the communication network. After the last sensor adapter module in the series, each safety message is echoed back along the communication network. Each sensor adapter module, upon receiving a safety message, increments a count in that message and transmits the resultant safety message to another module. When a sensor indicates a fault condition, the associated sensor adapter module blocks propagation of safety messages along the communication network. The sensor bus controller determines, in response to a failure to receive the echo and to the count in the echo, whether a fault occurred.

25 Claims, 3 Drawing Sheets

SYSTEM FOR MONITORING A PLURALITY OF SENSORS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a system that monitors a plurality of sensors to detect when any one of them senses a fault condition, and more particularly to safety monitoring equipment for a cable vehicle system, such as an aerial tramway or a chair type ski lift.

2. Description of the Related Art

Elevated transport systems such as an aerial tramway, cable car, or a chair lift, has a vehicle attached to a continuous loop of cable that extends up a mountain and then returns back down the mountain. A series of towers have pulleys, also called sheaves, on one side over which the cable rides in the upward direction and another set of pulleys on the opposite of the tower over which the cable rides on the downward direction. An electric motor or fuel powered engine is typically located at the bottom of the mountain to drive the cable around the circuit formed by the tower assembly and thereby up and down the mountain.

The major safety concern is that the cable properly rides over the pulleys. The most fundamental safety system for monitoring the cable is an electrical conductor that forms a wide loop through which the cable passes upon traversing past a tower. Normally the cable does not contact this conductor and electricity flows through the conductor providing an indication of the satisfactory operation of the cable. If the cable jumps off a pulley, the cable saws through the electrical conductor, interrupting the flow of electricity thereby providing a signal to a monitoring device that a cable malfunction occurred. This type of rudimentary sensor provided only an indication after a catastrophic failure took place. It became desirable to detect a potential malfunction before a catastrophic failure occurred.

As a result, an apparatus was devised that sensed the position of the cable on the pulleys to detect if the cable wandered to one side or came off a pulley. That sensing apparatus detected when the cable came out of a center groove in the pulley, upon which case, the cable vehicle system was shut down before the cable became fully dislodged. A small deviation of the cable from the nominal location caused a reduction in the cable speed. If the deviation became greater, exceeding a given amount, the safety system shut down the elevated cable system.

Relatively sophisticated proximity sensors have been developed to detect the relative location of a metal object with respect to the body of the sensor. These sensors also have internal diagnostic capability which provides information to a central monitoring system when the sensor becomes unreliable or inoperable. Such sophisticated proximity sensors are marketed under the iProx™ brand name by Eaton Corporation of Cleveland, Ohio, USA.

On an elevated cable vehicle system, it may be relatively difficult and time consuming to travel to the tower on which the inoperable cable sensor is located in order to perform maintenance activity. As a consequence, it often is desirable to be able to continue operating the cable vehicle system until a malfunctioning sensor can be repaired or replaced. However, previous safety systems disabled the operation of the entire cable vehicle system even when only one sensor was inoperative. The only solution was to disable the entire safety apparatus and operate the cable system without cable monitoring.

Therefore, it is desirable be able to bypass a malfunctioning sensor and continue otherwise normal operation of the safety monitoring system. It also is important to be able to locate the particular tower and even the specific sensor that has malfunctioned, in order to expedite maintenance and repair.

SUMMARY OF THE INVENTION

A monitoring system for detecting a fault in an apparatus comprises a communication network to which a sensor bus controller and a plurality of sensor adapter modules are connected. The sensor bus controller transmits a safety message onto the communication network and receives the safety message back from the communication network. The sensor bus controller responds to failing to receive the safety message by determining that a fault occurred, in which situation a fault indication is produced.

A plurality of sensors are provided to detect operating conditions of the apparatus, with at least one sensor being connected to each sensor adapter module. The sensor adapter modules are connected in a series to the communication network. Each sensor adapter module, upon receiving the safety message, increments a count in the safety message and then transmits the safety message back onto the communication network. In addition, each sensor adapter module responds to the associated sensor or sensors by determining whether a fault condition exists, in which case that that sensor adapter module blocks propagation of safety messages along the communication network.

Preferably the monitoring system also has a diagnostic communication link over which the sensor bus controller interrogates the plurality of sensor adapter modules to ascertain which module determined whether a fault condition existed.

In the preferred embodiment of the monitoring system, the communication network comprises a first communication link and a second communication link to both of which the plurality of sensor adapter modules are connected in a daisy chain series. After the last sensor adapter module in the series, the first communication link is connected to the second communication link. Upon receiving a safety message from the first communication link, each sensor adapter module increments the count in that message and sends the resultant safety message back onto the first communication link for further processing by devices on the communication network. Each sensor adapter module, upon determining that a fault condition exists blocks propagation of the safety message along the second communication link. Blockage of transmission of the safety message or an incorrect count, causes the sensor bus controller to produce the fault indication.

Another preferred aspect of the present monitoring system is the ability to bypass a malfunctioning component, such as a sensor, and still operate with the remaining components. This function is accomplished by the sensor bus controller sending a message to the sensor adapter module associated with the malfunctioning component, instructing that sensor adapter module to ignore signals from the particular component and otherwise function normally. The sensor bus controller then sends a safety message that contains an indication that a sensor adapter module is ignoring signals from a sensor.

DETAILED DESCRIPTION OF THE INVENTION

Figure 1:
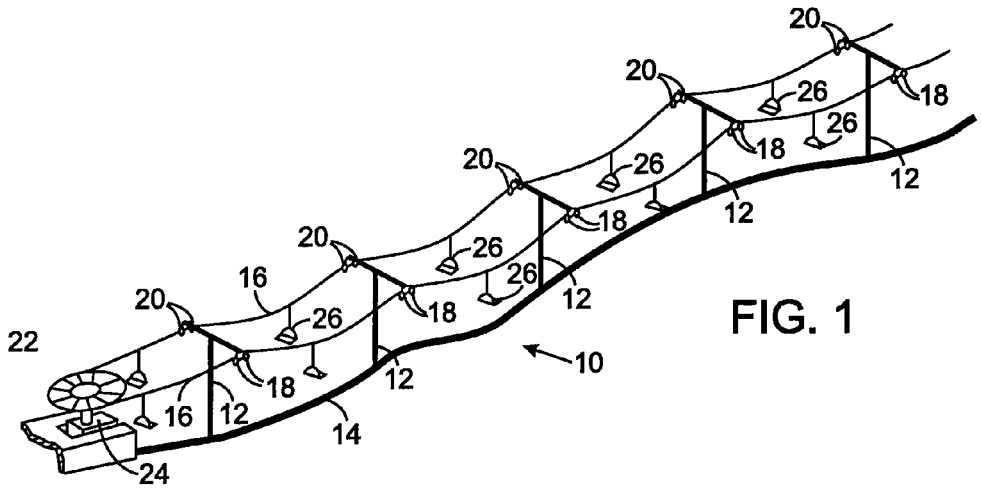
FIG. 1 is an isometric view of a chair lift, which incorporates the present invention.

With initial reference to FIG. 1, a cable vehicle system 10 according to the present invention is depicted as a chair lift for a ski area, however, the present cable monitoring system can be utilized with other cable vehicle systems, such as an aerial tramway with gondolas or a terrestrial cable car system. The exemplary cable vehicle system 10 has a plurality of towers 12 located at regular distances up a mountain 14. A braided metal cable 16 is strung on sets of pulleys 18 and 20 located on opposite sides of each tower 12. A first pair of pulleys 18 on one side of each tower carries the cable in a direction up the mountain 14, while a second pair of pulleys 20 on the opposite of each tower carries the cable in a downward direction. For ease of illustration, only a pair of pulleys is shown on each side of the towers, whereas a typical cable system often has more pulleys on each tower side. At the bottom of the mountain, the cable 16 winds around a generally horizontally oriented drive wheel 22 that is driven by an electric motor or fuel powered engine 24. Motion of the drive wheel 22 is controlled by a conventional operating system located at the base of the mountain 14. A similar, non-powered horizontal wheel is located at the top of the mountain around which the cable 16 winds to return down the mountain. A platform is provided at both ends for skiers to embark and disembark the chairs 26 which are suspended from the cable.

Figure 2:
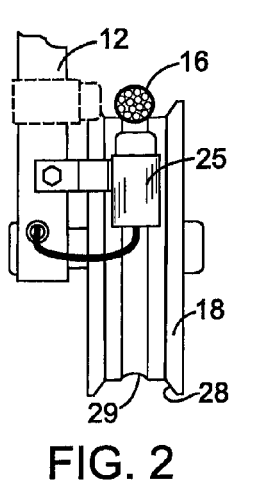
FIG. 2 illustrates a cable sensor adjacent a pulley on a tower in FIG. 1, with the cable centered on the pulley.

A pair of sensors is located on each side of every tower 12 to sense the position of the cable 16 near the first pulley and again near the last pulley over which the cable passes on that tower. With reference to FIG. 2, each pulley 18 and 20 has a relatively wide circumferential groove 28 with an annular center notch 29 therein. When the cable 16 is properly positioned on the pulley 18, the "Normal" position, it rides within the center notch 29. A sensor 25 is located adjacent the pulley to detect the relative position of the cable 16 within the groove 28. Although the sensor 25 is shown coplanar with an adjacent pulley 18, the sensor may be positioned parallel to the pulley's axis facing the cable, as depicted by dashed lines in FIG. 2. The cable sensor 25 preferably is an inductive proximity sensor, such as one marketed under the brand name iProx™ by Eaton Corporation of Cleveland, Ohio, USA. The proximity sensor not only can detect the presence or absence of the metal cable 16 in the pulley groove 28, but also the position of the cable laterally within that groove. That is, the proximity sensor detects when the cable 16 is within the center notch 29 as shown in FIG. 2 or when the cable 16 has ridden out of the center notch 29 to either extreme side of the pulley (designated the "Too Far" position) as shown by the positions of cables 16 and 16a in FIG. 3. When the pulley's center notch 29 becomes worn excessively as shown in FIG. 4, the cable moves closer to the cable sensor 25 into a position designated "Too Close". When the cable initially rides out of the center notch 29 but has not reached an extreme Too Far position as depicted in FIG. 5, the cable is in what is referred to as an intermediate position. The proximity sensor 25 emits an electrical signal that indicates the relative position of the cable 16 and by comparing that signal to different thresholds the location of the cable in each of the Normal, Too Far, Too Close, and intermediate positions can be determined.

Figure 6:
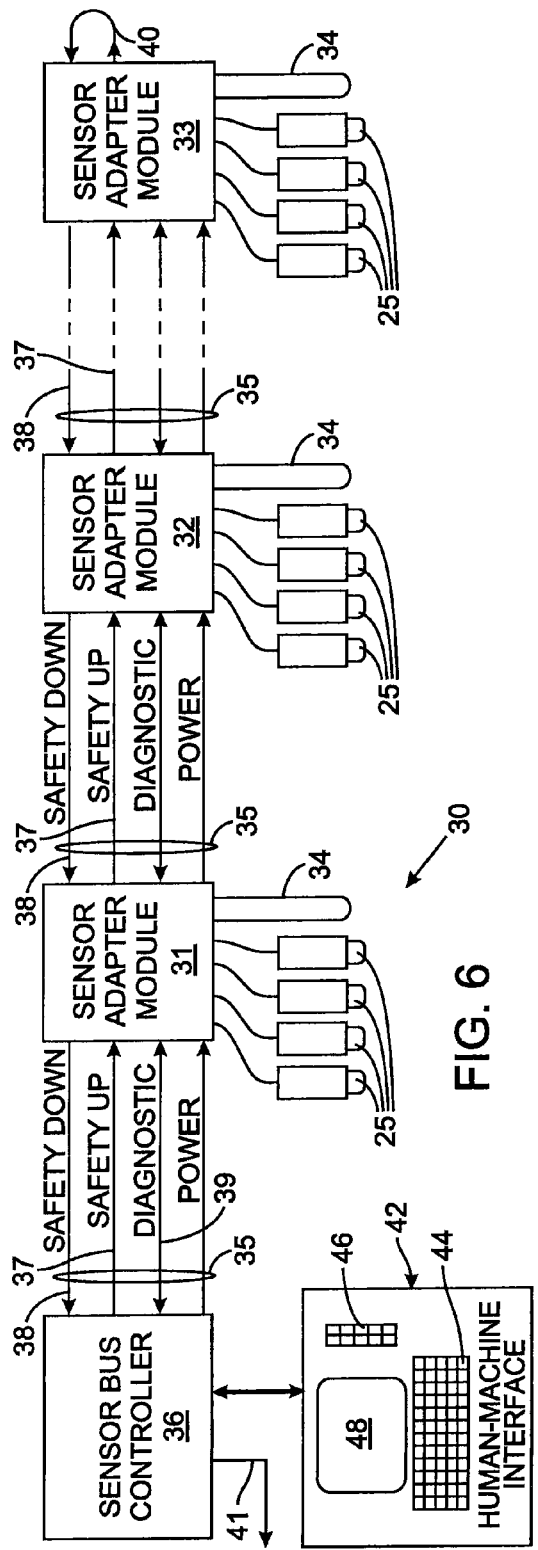
FIG. 6 is a block schematic diagram of the safety monitoring system for the chair lift in FIG. 1.

The cable sensors 25 are part of a safety monitoring system 30 shown in FIG. 6. The four sensors 25 on a given tower 12, two sensors on each side, are connected to a sensor adapter module 31, 32, or 33 also mounted on that tower. Alternatively, only two sensors or even only one sensor can be connected to each sensor adapter module in which case there would be more than one such module on each tower. For ease of illustration, only three sensor adapter modules are illustrated in FIG. 6 with the understanding that there is a separate module on each tower up the mountain. Also connected to each sensor adapter module 31-33 is a conventional cut cable sensor 34, in the form of an electrical conductor that loops around or is otherwise position near the cable 16 in a manner so that the conductor will be severed upon the cable coming off the pulleys. A common conductor loop is utilized for both the upward and downward legs of the cable 16.

The sensor adapter modules 31-33 are series connected in a daisy-chain manner to a sensor bus controller 36 by a set of electrical cables 35. The multi-conductor cable 35 which carries several communication links. As will be described in greater detail, the communication links comprise a first, or Safety Up, link 37 which carries a safety message in a direction up the mountain 14, a second, or Safety Down, link 38 carrying the safety message down the mountain, a bidirectional Diagnostic link 39 conveying messages for diagnostic purposes, and a pair of wires carries electrical power. Conductors between adjacent sensor adapter modules combine to form the Safety Up link 37 and the Safety Down link 38, and the Safety Up and Down links together form a communication network. The connections of the cables 35 on both sides of each sensor adapter module 31-33 preferably include lightning protectors. In addition, the wires extending from each sensor adapter module to the sensors 25 also include lightning protection.

The sensor bus controller 36 is located at the control station for the cable vehicle system 10, e.g. the location where the motor or engine 24 is located. The sensor bus controller 36 has a connection 41 for interfacing to the control apparatus for the cable vehicle system 10. Connection 41 may simply be a plurality of switch contacts that open and close to indicate different fault conditions or it may be a serial communication interface to the cable vehicle system. In addition, the sensor bus controller is connected to a human-machine interface 42 by which the operator of the cable vehicle system controls the safety monitoring system 30. In some systems, various control functions of the sensor bus controller 36 may be performed by the human-machine interface. Alternatively, the functionality of the human-machine interface can be incorporated into the sensor bus controller.

The human-machine interface 42 is a conventional device that has a keyboard 44 and other input switches 46 by which the operator of the cable vehicle system 10 or service personnel request operational information from the safety monitoring system 30 and enter commands governing its operation. A display 48 is provided by which operational information is presented to the operator. As will be described, in case of a cable fault, the safety monitoring system 30 determines at which sensor adapter module 31-33 the fault occurred and indicates that location on the display 48, for example. The display 48 may be any of several conventional devices, such as an LED or LCD panel, capable of displaying alphanumeric information. Alternatively a touch screen type display can be used, in which case the separate keyboard 44 may be eliminated.

Figure 7:
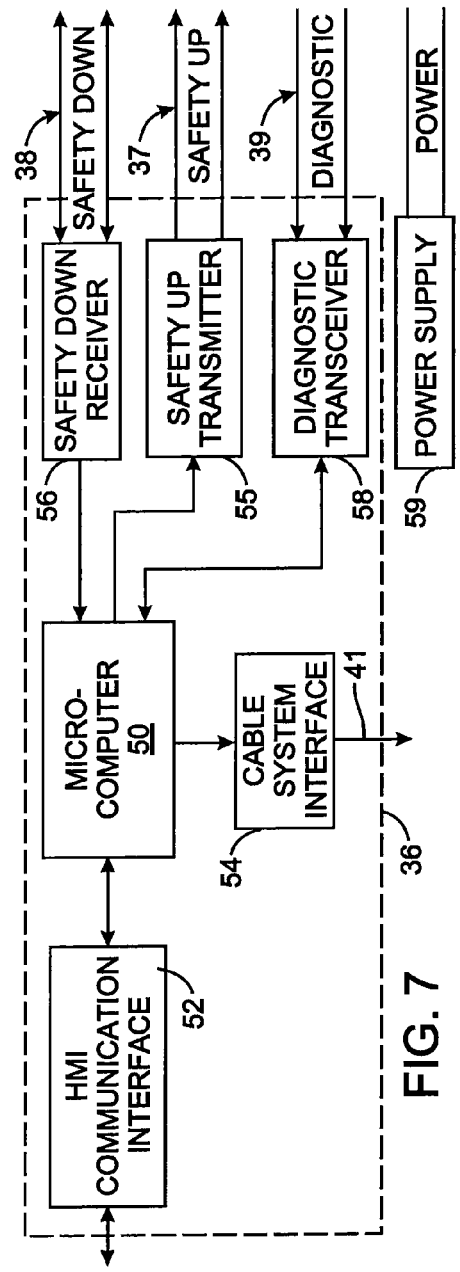
FIG. 7 is a block schematic diagram of the sensor bus controller in FIG. 5.

The sensor bus controller 36 is shown in greater detail in FIG. 7 and comprises a microcomputer 50 to which the human-machine interface 42 is connected via an HMI communication interface 52. The microcomputer 50 has a cable system interface 54 that sends control signal via connection 41 to the cable vehicle system 10. The microcomputer 50 has an internal memory that stores a software program and data for the operation of the controller. As will be described, in case of a cable fault condition, microcomputer 50 sends control signals to the control circuitry of the cable vehicle system.

The microcomputer 50 periodically formulates safety messages which are sent serially via a safety up transmitter 55 onto the Safety Up link 37. Upon reaching the top of the mountain 14 the safety message is conveyed by a loop connection 40, at the most remote sensor adapter module 33, onto the Safety Down link 38 as shown in FIG. 6. The returned message on the Safety Down link 38 is received by the sensor bus controller 36 at a safety down receiver 56 which conveys the message to the microcomputer 50. At other times, the microcomputer 50 exchanges diagnostic messages via a diagnostic transceiver 58 that is connected to the Diagnostic link in cable 35. Located adjacent the sensor bus controller 36 is a power supply 59 which, in addition to providing electrical power to that controller's components, provides electrical power via the cable 35 to the sensor adapter modules 31-33.

Figure 8:
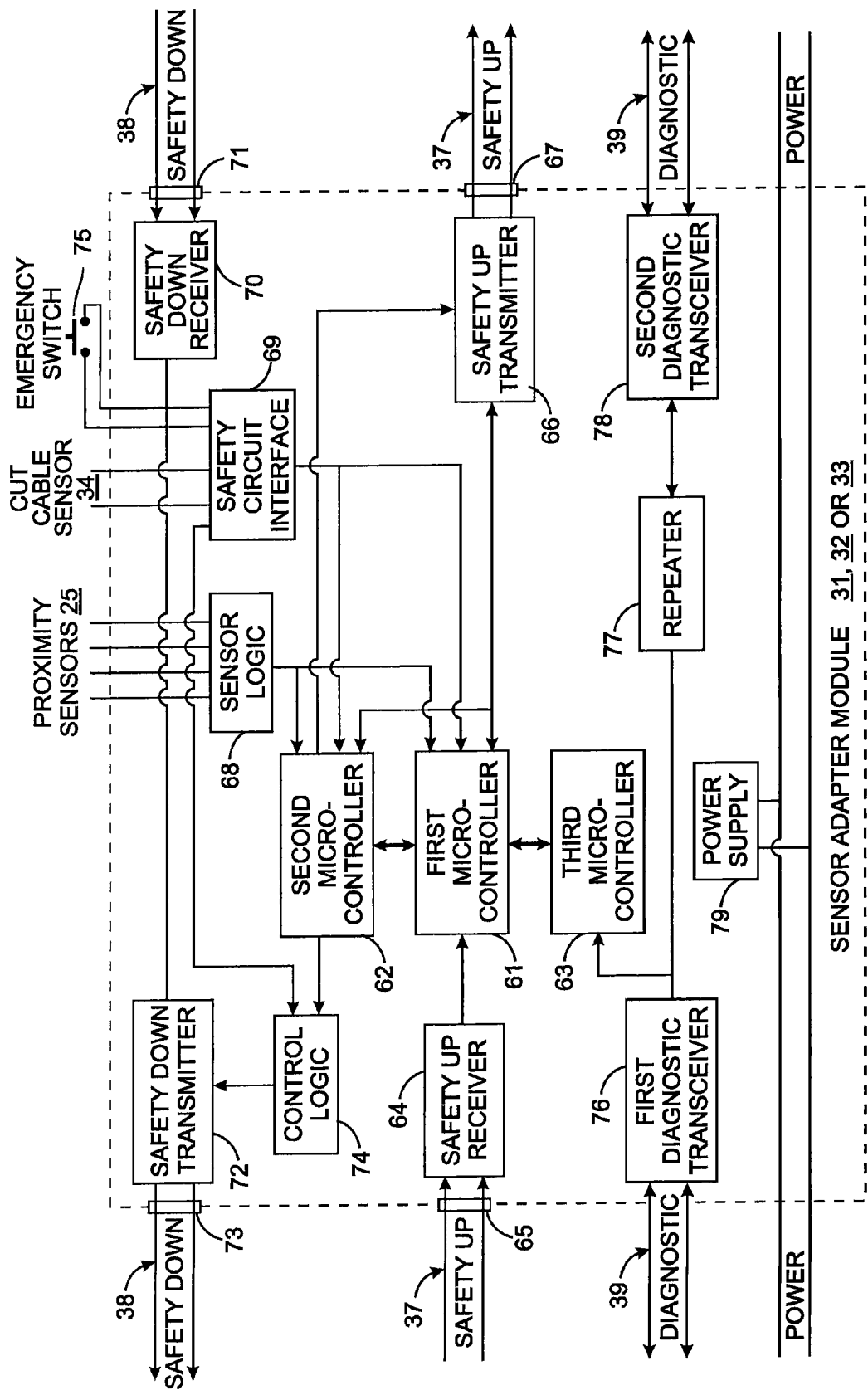
FIG. 8 is a block schematic diagram of one of the sensor adapter modules in FIG. 6.

The details of each sensor adapter module 31-33 are depicted in FIG. 8. The sensor adapter module has three microcontrollers 61, 62 and 63. A safety up receiver 64 accepts an incoming safety message from the Safety Up link 37 through a first input 65 and conveys that message to the first microcontroller 61. The first microcontroller 61 processes that message to produce an outgoing safety up message which is sent through a safety up transmitter 66 and a first output 67 onto the Safety Up link 37 to the next sensor adapter module up the mountain. That processing of a safety up message is in response to sensor signals conveyed by a sensor logic circuit 68 to the first microcontroller 61 and in response to the continuity of the cut cable sensor 34 and a manual emergency switch 75 as indicated by a safety circuit interface 69.

Note that the most remote sensor adapter module 33 at the top of the mountain has the output of its safety up transmitter 66 coupled directly to the safety down receiver 70 via loop connection 40 (FIG. 6) so that after processing, the safety message 80 is immediately echoed onto the Safety Down link 38.

The safety message promulgating on the Safety Down link 38 is received at the sensor adapter module 31-33 by a safety down receiver 70 through a second input 71 and conveyed directly to a safety down transmitter 72. The safety down transmitter 72 is enabled and disabled by control logic 74 in response to control signals from the safety circuit interface 69 and the second microcontroller 62. When a catastrophic fault is detected by one of the sensor adapter modules 31-33, it control logic 74 disables operation of the safety down transmitter 72 to terminate transmission of the safety message down the mountain to the sensor bus controller 36. Such a catastrophic fault may be the cable 16 moving to an extreme inner or outer position on the pulley as detected by one of the sensors 25 or by the cable severing the cut cable sensor 34.

As will be described in greater detail, when the sensor bus controller 36 receives a fault condition on the sensor down link, diagnostic messages are sent to the sensor adapter modules 31-33 to determine which one responded to the fault. Each sensor adapter module has a first diagnostic transceiver 76 that is connected to the Diagnostic link from the adjacent sensor adapter module down the mountain in the safety monitoring system 30. The first diagnostic transceiver 76 is connected to a bidirectional signal repeater 77 which also is connected to a second diagnostic transceiver 78 that is connected to the Diagnostic link leading to the adjacent sensor adapter module up the mountain. The first and second diagnostic transceivers 76 and 78 and the repeater 77 are bidirectional and relay diagnostic messages in the up and down mountain directions. The diagnostic messages are applied to an input of the third microcontroller 63 which decodes those messages, replies to diagnostic messages directed to that particular sensor adapter module, and transmits a reply message to the first diagnostic transceiver for transmission to the sensor bus controller 36. The power conductors within electrical cable 35 are connected to a power supply 79 which provides electrical power to the components of the sensor adapter module.

During operation of the cable vehicle system 10, the sensor bus controller 36 periodically sends a safety message onto the Safety Up link 37. FIG. 8 graphically depicts the contents of that message which has a binary digital format, although other formats can be used. The safety message 80 commences with a start bit 81 which is followed by three bits that indicate the operating mode of the cable monitoring system. Those modes comprise a Normal Mode, Bypass Mode, a Bypass Initialization Mode and an Automatic Addressing Mode. The Normal Mode occurs when the safety monitoring system 30 is functioning properly. The Bypass Mode indicates that one or more sensors or sensor adapter modules is bypassed, i.e., is not being monitored, and the Bypass Initialization Mode is used to commence the Bypass Mode, as will be described. The Automatic Addressing Mode occurs when a sensor adapter module 31-33 is either added to or removed from the system, thereby requiring a reassignment of the addresses to those modules. Any well known process for automatically assigning addresses to devices on a network may be used for this purpose. Alternatively addresses can be assigned by manually setting switches at each sensor adapter module. The safety message 80 also includes a five-bit sensor adapter module (SAM) count that is incremented each time a sensor adapter module 31-33 processes the safety message 80, thereby this count indicates that each sensor adapter module has functioned properly. A Wind Bit 84 provides an indication of whether the cable 16 has been affected by a strong wind and has left the center notch 29 in a pulley 18, but has not reached an extreme Too Far position, e.g. the cable is in the intermediate position shown in FIG. 5. The safety message concludes with a stop bit 85.

Assuming that the cable vehicle system 10 and the safety monitoring system 30 are functioning satisfactorily, the safety message designates the Normal Mode in the mode field 82, a zero SAM count field 83, and a zero Wind Bit 84. Upon the first sensor adapter module 31 receiving the safety message 80, its first microcontroller 61 inspects the status of the sensors 25 using data received from the sensor logic circuit 68 to determine whether all the sensors indicate that the cable 16 adjacent their respective locations is in the nominal center position on the pulley, as shown in FIG. 2. Each sensor 25 provides an indication of the relative pulley position of the cable 16 and may indicate that the sensor is at the centered Normal position, a Too Far position shown in FIG. 3 or the Too Close position in FIG. 4. As noted previously, the cable 16 may be in an intermediate position in FIG. 5, where it is out of the annular center notch 29, but has not reached one of an extreme Too Far position, as occurs when a strong wind acts on the cable and the chairs 26. This intermediate position is referred to as a Wind Slow state. If the cable 16 is within the center notch 29 and the emergency switch has not been closed, the first microcontroller 61 merely increments the contents of the SAM count field 83 and passes the modified safety message 80 to the safety up transmitter 66 in FIG. 8. That message is then sent to the next sensor adapter module 32 up the mountain. If a Wind Slow event occurs in which the cable has moved slightly out of the center notch 29, the first microcontroller 61 indicates that fact by setting the Wind Bit 84 to a value of one before forwarding the safety message 80.

Figure 3:
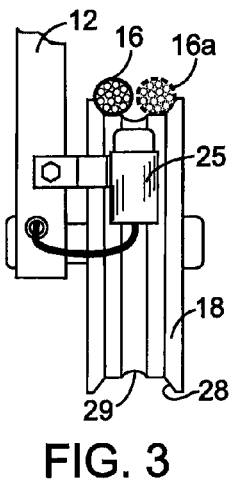
FIG. 3 shows the cable sensor adjacent a pulley where the cable has moved toward the tower.
Figure 4:
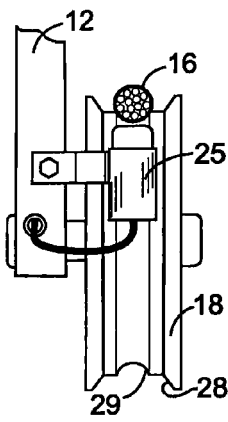
FIG. 4 illustrates the sensor adjacent a pulley with a worn central notch in which the cable rides.
Figure 5:
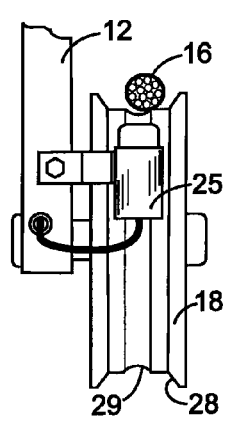
FIG. 5 show a cable that has moved partially out of the central notch of a pulley.
Figure 9:
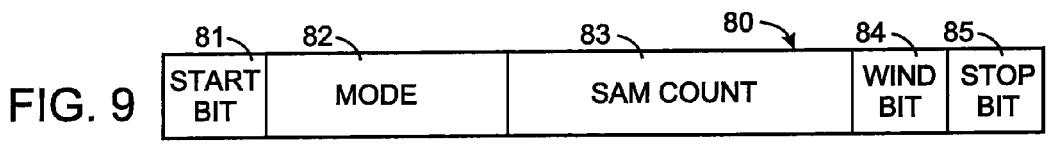
FIG. 9 depicts a message sent over a communication network of the safety monitoring system of FIG. 6.

If the cable 16 reaches either the Too Close or Too Far position on a pulley 18, as indicated in FIG. 3 or 4, the associated sensor 25 provides a corresponding indication via the sensor logic circuit 68 to the first microcontroller 61. If the cable comes off a pulley, conductor loop of the associated cut cable sensor 34 is severed and no longer conducts electricity. A cut cable failure is detected at the safety circuit interface 69 and a corresponding alert signal is sent to both the second microcontroller 62 and the control logic 74. The safety circuit interface 69 also responds to closure of the emergency switch 75. Occurrence of any of these significant fault conditions results in the first microcontroller 61 not sending a modified safety message 80 to the safety up transmitter 66, thereby blocking promulgation of the safety message on the Safety Up link 37.

The cable in the Too Close or Too Far position also causes the second microcontroller 62 to disable the safety down transmitter 72. The second microcontroller 62 also disables the safety down transmitter 72 if the first and second microcontrollers do not agree on the status of the various sensor signals. In addition the sensor logic circuit 68 responds to severing the cut cable sensor 34 and closing the emergency switch 75, by signaling the control logic 74 to disable to safety down transmitter 72. When disabled, the safety down transmitter 72 interrupts communication of the Safety Down link 38 so that a safety message 80, which promulgated the length of the Safety Up link 37 to the top of the mountain and was echoed back down the Safety Down link 38, will not be received by the sensor bus controller 36. The sensor logic circuit 68 responding to the cut cable sensor 34 and the emergency switch 75 is independent of operation of the microcontrollers 61-63, thereby still blocking promulgation of the safety message should a major cable fault occur during a software malfunction. In the absence of a extreme cable fault condition, the safety message 80 is passed unaltered along the Safety Down link 38.

The safety message 80 does not contain information as to which sensor adapter module 31-33 altered the Wind Bit 84 in the safety message 80 nor does blocking a safety message on the Safety Down link 38 indicate which sensor adapter module blocked that transmission. Utilizing simplified safety message management, eliminates complex and relatively time consuming message processing which enables the safety message to propagate up and down the mountain relatively quickly. Thus the safety monitoring system 30 responds quickly to catastrophic faults.

Upon receiving a safety message 80 on the Safety Down link 38, the sensor bus controller 36 in FIG. 7 compares the value in the SAM count field 83 and to the known number of sensor adapter modules 31-33 in the safety monitoring system 30. Under proper operating conditions, the SAM count field 83 should indicate the number of sensor adapter modules in the system. If those values do not coincide, the microcomputer 50 concludes that a processing error occurred, as apparently one of the sensor adapter modules failed to process the safety message 80. In that case, the microcomputer 50 issues a Shut Down signal, via the cable system interface 54 and connection 41, to the control apparatus for the cable vehicle system 10. Otherwise when the contents of the SAM count field 83 equals the number of sensor adapter modules 31-33, the microcomputer 50 concludes that all of the sensor adapter modules are functioning.

The microcomputer 50 in the sensor bus controller 36 then inspects the Wind Bit 84 to determine whether any of the sensors 25 detected a slight movement of the cable 16 as occurs under high wind conditions. If the Wind Bit 84 is found set, the microcomputer 50 issues a different signal via the cable system interface 54 to the control apparatus for the cable vehicle system 10 instructing that speed of the cable be decreased to counter the high wind conditions. Thereafter, when the Wind Bit 84 in a subsequent echoed safety message is found with a zero value, the sensor bus controller 36 terminates sending the wind fault signal to the cable vehicle system 10 thereby enabling normal cable speed to resume.

After sending a safety message 80 onto the Safety Up link 37, if the sensor bus controller 36 does not receive an echoed safety message on the Safety Down link 38 after the normal amount of time for the message to propagate up and down the mountain, the microcomputer 50 determines that a serious fault condition exists in the cable vehicle system. This failure to receive an echoed safety message typically occurs when one of the sensor adapter modules 31-33 blocked the passage of messages on the Safety Down link 38. The sensor bus controller 36 responds to the non-receipt of an echoed safety message 80 by issuing Shut Down signal, via the cable system interface 54, to the control apparatus for the cable vehicle system 10.

The various fault and other operating conditions determined by the microcomputer 50 also generate messages sent through the HMI communication interface 52 to the human-machine interface 42 in FIG. 6. That latter interface 42 provides an indication of the corresponding operating condition to the cable system operator via a message on display 48. Either the sensor bus controller 36 or the human-machine interface 42 also may have external annunciators, such as audible devices or lights that are activated during a serious fault condition.

Figure 10:
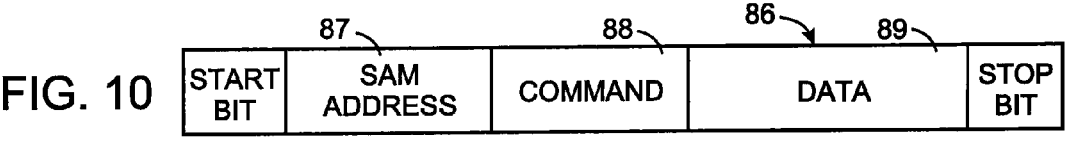
FIG. 10 depicts a command message sent via the communication network.

When the microcomputer 50 in the sensor bus controller 36 detects an abnormal operating condition, the diagnostic transceiver 58 sends a diagnostic message over the Diagnostic link 39 to each sensor adapter module 31-33. The Diagnostic link 39 conforms to the Modbus RS-485 standard protocol. An exemplary format for a diagnostic message 86 as shown in FIG. 10 and comprises the network address 87 of the intended sensor adapter module (SAM) 31-33, a command 88 for the sensor adapter module to execute (e.g. send status), and any data 89 required to execute that command. The microcomputer 50 sequentially sends a separate diagnostic message addressed to each the sensor adapter module 31-33 inquiring as to the current operating state of that module. As noted above, the safety message 80 does not identify which sensor adapter module 31-33 altered the Wind Bit 84 nor does blocking a safety message on the Safety Down link 38 indicate which sensor adapter module blocked that transmission. As a consequence, each sensor adapter modules 31-33 is queried determine where the fault occurred.

Figure 11:
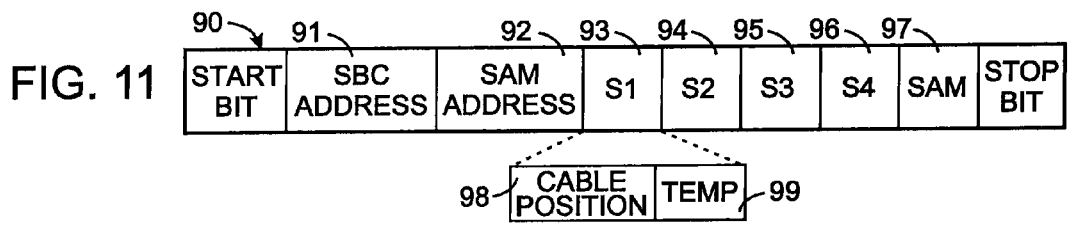
FIG. 11 depicts a reply message sent in response to a command message.

With reference to FIG. 8, the third microcontroller 63 in each sensor adapter module 31-33 receives every diagnostic message and inspects that message to determine whether it contains the address of that particular sensor adapter module. If it has another address, the third microcontroller 63 ignores that diagnostic message. Upon detecting a diagnostic message that is addressed to the particular sensor adapter module 31-33, its third microcontroller 63 responds by querying the first microcontroller 61 to determine the status of each sensor 25 and the cut cable sensor 34. The third microcontroller 63 then formulates a reply message 90 as shown in FIG. 11 that has the address 91 of the sensor bus controller 36 and the particular sensor adapter module's address 92. The reply message 90 also has a separate field 93, 94, 95 and 96 for the status of each sensor 25 connected to that sensor adapter module. As shown broken out for the first sensor (S1), each of those fields 93-96 has a sub-field 98 which indicates that the cable 16 is in the normal position, Too Far, Too Close, has broken, or is in a Wind Slow position. A zero in the cable position sub-field indicates that the respective sensor is disconnected. The status for each sensor 25 also has a temperature sub-field 99 that designates whether the sensor temperature is normal, too low, or too high in comparison to respective threshold levels. Depending upon the sophistication of each sensor may send additional diagnostic information to the sensor adapter module 31-33, which also is inserted into another sub-field of the diagnostic reply message 90. A field 97 also is provided in the diagnostic reply message 90 for status and diagnostic information pertaining to operation of the sensor adapter module.

The formulated diagnostic reply message is then sent onto the Diagnostic link. Specifically it is sent to the first diagnostic transceiver 76 where it is transmitted down the mountain 14 to the sensor bus controller 36. Upon receiving the diagnostic reply message, the sensor bus controller 36 sends the status data to the human-machine interface 42 at which the information is presented on the display 48. For example, the display 48 indicates the nature of the cable fault condition and which sensor adapter module and specific sensor 25 detected that fault condition. Human-machine interface 42 also provides an overall status indication of whether the monitoring system is in a Normal, Fault, or Wind Slow state.

When a diagnostic reply message is received by the sensor bus controller 36 which indicates that a sensor 25 is malfunctioning, the safety monitoring system 30 can automatically enter a bypass mode in which further signals from that sensor are ignored. As long as there still is another sensor at the sensor adapter module that is monitoring the cable in the same direction of travel as the malfunctioning sensor, the cable monitoring system can continue to operate in a relatively safe state. In addition, the operator of the cable vehicle system 10 can manually bypass the operation of a particular sensor or an entire sensor adapter module 31-33 as may be needed to perform maintenance or repair service on that particular device. For example, the operator may respond to a sensor indicating that the cable is in the Too Close position by bypassing that sensor until service personnel are able to inspect the associated pulley. To initiate bypassing, the operator enters the appropriate command into the keyboard 43 of the human-machine interface 42 to designate the device to be bypassed.

With the bypass mode commences, the sensor bus controller 36 sends a safety message 80 which contains a value in the mode field 82 designating bypass initialization. This informs the sensor adapter modules 31-33 that the safety monitoring system 30 is entering the bypass mode. At the same time, the sensor bus controller 36 transmits a diagnostic message that is addressed to the particular sensor adapter module 31-33 that is either to be entirely bypassed or having the sensor to be bypassed. This diagnostic message contains a command that causes the sensor adapter module to either ignore the signals from that particular sensor 25 or enter a SAM bypass state in which the entire sensor adapter module 31-33 is bypassed. A sensor adapter module in the SAM bypass state does not alter the Wind Bit 84 of any safety message 80 received on the Safety Up link 37, but merely increments the SAM count 83. Furthermore, a sensor adapter module in the SAM bypass state always transmits a safety message 80 received on the Safety Down link by continuously enabling its safety down transmitter 72 regardless of the signals from its sensors 25 or the cut cable sensor 34.

Thereafter, as long as the safety monitoring system 30 remains in the bypass mode, each safety message 80 sent by the sensor bus controller 36 contains a value in the mode field 82 that designates an active bypass mode.

Upon rectifying the condition or malfunction that triggered the bypass mode, the sensor bus controller 36 sends another diagnostic message to the associated sensor adapter module 31-33 with a command that instructs the module to resume normal operation. Thereafter, each safety message 80 sent from the sensor bus controller 36 contains a value in the mode field 82 that designates the normal operating mode.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A monitoring system for detecting a fault in an apparatus comprising:

a communication network;

a sensor bus controller operably connected to transmit a safety message onto the communication network and receive the safety message back from the communication network, and the sensor bus controller determining in response to a failure to receive the safety message that a fault occurred in the apparatus in which situation the sensor bus controller issues a fault indication;

a plurality of sensors; and a plurality of sensor adapter modules connected in a series by the communication network, wherein each sensor adapter module upon receiving the safety message increments a count in the safety message and then transmits the safety message back onto the communication network, and wherein each sensor adapter module responds to at least one sensor by determining whether a fault condition exists, in which case that sensor adapter module blocks propagation of the safety message along the communication network.

2. The monitoring system as recited in claim 1 further comprising a human-machine interface by which a person receives information about an operating status of the apparatus.

3. The monitoring system as recited in claim 1 wherein the sensor bus controller further responds to the count in the safety message received from the communication network by determining whether a fault occurred in one of the plurality of sensor adapter modules.

4. The monitoring system as recited in claim 1 further comprising a diagnostic communication link coupled to the sensor bus controller and the plurality of sensor adapter modules; wherein, upon determining that the fault occurred, the sensor bus controller sends at least one diagnostic message via the diagnostic communication link, and upon receiving the diagnostic message a given one of the sensor adapter modules that blocked the safety message sends a message to the sensor bus controller indicating that the given sensor adapter module blocked the safety message.

5. The monitoring system as recited in claim 1 further comprising a diagnostic communication link coupled to the sensor bus controller and the plurality of sensor adapter modules, wherein upon determining that the fault occurred, the sensor bus controller sends a separate diagnostic message via the diagnostic communication link to each sensor adapter module, and upon receiving the diagnostic message each sensor adapter module sends a reply message to the sensor bus controller wherein the reply message indicates whether that particular sensor adapter module blocked the safety message.

6. The monitoring system as recited in claim 1 further comprising a diagnostic communication link over which the sensor bus controller transmits diagnostic messages to the plurality of sensor adapter modules, wherein one type of diagnostic message instructs a given sensor adapter module to terminate responding to a particular sensor and continue to process safety messages.

7. The monitoring system as recited in claim 6 wherein the safety message conveys an indication that one of the sensor adapter modules has terminated responding to a sensor.

8. The monitoring system as recited in claim 1 wherein the safety message conveys an indication of an operating state of the monitoring system.

9. The monitoring system as recited in claim 1 wherein each sensor adapter module further responds to a sensor indicating that an event occurred by changing a value in the safety message; and wherein the sensor bus controller responds to a change of the value in the safety message received from the communication network by producing an event indication.

10. The monitoring system as recited in claim 1 wherein the apparatus includes a cable that rides on a plurality of pulleys, and each sensor detects a position of the cable on one of the pulleys.

11. The monitoring system as recited in claim 10 wherein each sensor adapter module responds to a sensor indicating that the cable is in a first position by allowing the safety message to propagate along the communication network, and responds to that sensor indicating that the cable is in a second position by blocking propagation of the safety message.

12. The monitoring system as recited in claim 11 wherein each sensor adapter module responds to a sensor indicating that the cable is in a third position by changing a value in the safety message.

13. A monitoring system for detecting a fault in an apparatus comprising:
 a first communication link and a second communication link;
 a sensor bus controller connected to the first and second communication links, and transmitting a safety message onto the first communication link and determining that a fault occurred in the apparatus if the safety message is not received on the second communication link, in which situation the sensor bus controller produces a fault indication;
 a plurality of sensors for detecting operating conditions of the apparatus; and
 a plurality of sensor adapter modules coupled to the plurality of sensors and connected in a series by the first communication link and by the second communication link over both of which links the safety message travels in opposite directions through the series, each sensor adapter module having a first input and a first output connected to the first communication link and a second input and a second output connected to the second communication link, at a last sensor adapter module in the series the first output is connected to the second input thereby applying the safety message from the first communication link to the second communication link;
 wherein each sensor adapter module upon receiving the safety message at the first input increments a count contained in that safety message and sends the safety message containing the incremented count through the first output to an adjacent sensor adapter module along the first communication link, and transmits the safety message received at the second input to the second output unless a sensor connected to that sensor adapter module indicates a fault condition in which situation transmission of the safety message between second input and the second output is blocked.

14. The monitoring system as recited in claim 13 wherein the plurality of sensor adapter modules are coupled in a daisy chain to the first and second communication links.

15. The monitoring system as recited in claim 13 further comprising a diagnostic communication link coupled to the sensor bus controller and the plurality of sensor adapter modules; wherein, upon determining that the fault occurred, the sensor bus controller sends at least one diagnostic message via the diagnostic communication link, and upon receiving the diagnostic message a given one of the sensor adapter modules that blocked the safety message sends a message to the sensor bus controller indicating that the given sensor adapter module blocked the safety message.

16. The monitoring system as recited in claim 13 further comprising a diagnostic communication link coupled to the sensor bus controller and the plurality of sensor adapter modules, wherein upon determining that the fault occurred, the sensor bus controller sends a separate diagnostic message via the diagnostic communication link to each sensor adapter module, and upon receiving the diagnostic message each sensor adapter module sends a reply message to the sensor bus controller wherein the reply message indicates whether that particular sensor adapter module blocked the safety message.

17. The monitoring system as recited in claim 13 wherein the sensor bus controller further responds to the count in the safety message received from the second communication link by determining whether a fault occurred in one of the plurality of sensor adapter modules.

18. The monitoring system as recited in claim 13 further comprising a diagnostic communication link over which the sensor bus controller transmits diagnostic messages to the plurality of sensor adapter modules, wherein one type of diagnostic message instructs a given sensor adapter module to terminate responding to a particular sensor and continue to process safety messages.

19. The monitoring system as recited in claim 18 wherein the safety message conveys an indication that one of the sensor adapter modules has terminated responding to a sensor.

20. The monitoring system as recited in claim 13 wherein the safety message conveys an indication of an operating state of the monitoring system.

21. The monitoring system as recited in claim 13 wherein each sensor adapter module further responds to a sensor indicating that an event occurred by changing a value in the safety message; and wherein the sensor bus controller responds to a change of the value in the safety message received from the second communication link by producing an event indication.

22. The monitoring system as recited in claim 13 wherein the apparatus includes a cable that rides on a plurality of pulleys, and each sensor detects a position of the cable on one of the pulleys.

23. The monitoring system as recited in claim 22 wherein each sensor adapter module responds to a sensor indicating that the cable is in a first position by allowing the safety message to propagate along the second communication link, and responds to that sensor indicating that the cable is in a second position by blocking propagation of the safety message.

24. The monitoring system as recited in claim 23 wherein each sensor adapter module responds to a sensor indicating that the cable is in a third position by changing a value in the safety message.

25. The monitoring system as recited in claim 13 wherein each sensor adapter module inhibits sending the safety message through the first output when the fault condition exists.

* * * * *